(12) United States Patent
Fujisawa et al.

(10) Patent No.: US 8,412,634 B2
(45) Date of Patent: Apr. 2, 2013

(54) AUTHENTICATING METHOD

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 3294 days.

(21) Appl. No.: 10/220,614

(22) PCT Filed: Feb. 28, 2001

(86) PCT No.: PCT/JP01/01478
§ 371 (c)(1),
(2), (4) Date: Sep. 3, 2002

(87) PCT Pub. No.: WO01/65386
PCT Pub. Date: Sep. 7, 2001

(65) Prior Publication Data
US 2003/0023566 A1    Jan. 30, 2003

(30) Foreign Application Priority Data

Mar. 3, 2000   (JP) .................................. 2000-58390
Dec. 14, 2000  (JP) .................................. 2000-381019

(51) Int. Cl.
*G06F 21/00*    (2006.01)
(52) U.S. Cl. ................ 705/50; 705/51; 705/52; 705/53; 705/54; 705/55; 705/56; 705/57; 705/58; 705/59
(58) Field of Classification Search ............... 705/50–59
See application file for complete search history.

(56) References Cited

U.S. PATENT DOCUMENTS

| 4,839,829 A * | 6/1989 | Freedman ..................... 715/751 |
| 5,892,900 A * | 4/1999 | Ginter et al. .................... 726/26 |
| 6,088,585 A * | 7/2000 | Schmitt et al. ............. 379/93.03 |
| 6,144,848 A * | 11/2000 | Walsh et al. .................... 705/50 |
| 6,177,950 B1 * | 1/2001 | Robb ......................... 348/14.01 |
| 6,360,206 B1 * | 3/2002 | Yamashita ...................... 705/14 |
| 2002/0003892 A1 * | 1/2002 | Iwanaga ....................... 382/124 |

FOREIGN PATENT DOCUMENTS

| EP | 0 686 905 | * | 9/1995 |
| JP | 8-129591 |   | 5/1996 |
| JP | 8-130536 |   | 5/1996 |

(Continued)

OTHER PUBLICATIONS

Adgraphics (Verification engine, at http://trust4web.com/product_info.php?cPath=71&products_id=210&adgCsid=ecc3b0b008e198d8300957e1dbf96c7f).*

(Continued)

*Primary Examiner* — Calvin Loyd Hewitt, II
*Assistant Examiner* — Cristina Owen Sherr
(74) *Attorney, Agent, or Firm* — Manabu Kanesaka

(57) ABSTRACT

The present invention proposes a safe and quick individual certification method using a portable terminal. When a portable terminal 30 sends a request for certification to a certification server 10, the certification server 10 transmits query code for certification to the portable terminal 30. The portable terminal 30 transmits said query code to the certification server 10 via a reader 21 or the like and also via a sales management server 23 to be certified. The certification server 10 verifies the query code to that generated in the past, and returns a result of verification and personal data required by the sales management server 23 to the sales management server 23.

10 Claims, 8 Drawing Sheets

FOREIGN PATENT DOCUMENTS

| | | | |
|---|---|---|---|
| JP | 08129591 A | * | 5/1996 |
| JP | 08130536 A | * | 5/1996 |
| JP | 10-227397 | | 9/1996 |
| JP | 10-155170 | | 6/1998 |
| JP | 10-303886 | | 11/1998 |
| JP | 10303886 A | * | 11/1998 |
| JP | 10/341224 | | 12/1998 |
| JP | 10341224 A | * | 12/1998 |
| JP | 2001-148037 | * | 11/1999 |
| JP | 2000-10927 | | 1/2000 |
| JP | 2000010927 A | * | 1/2000 |

OTHER PUBLICATIONS

Random Number Generator History (http://www.google.com/search?q=random+number+generator+history&hl=en&tbs=tl:1&tbo=u&ei=GqGlSimQ-LED7MX05Al&sa=X&oi=timeline_result&ct=title&resnum=11.*

The History of RANDOM.ORG (© 1998-2009 Mads Haahr Valid XHTML 1.0 Transitional | Valid CSS Web Design by TSDA at http://www.random.org/history/).*

* cited by examiner

AUTHENTICATING METHOD

FIELD OF THE INVENTION

This invention relates to an individual certification method using a terminal for cellular telephone.

BACKGROUND TECHNOLOGY

Conventionally the most representative technological trend in the individual certification system is a method using a plastic card with a magnetic tape attached thereto as represented by a credit card, and in this method, data on an individual stored in the magnetic tape is read with a card reader and the individual is certified by collating the read data to those stored in a company managing the credit information. However, now many criminal acts such as forgery of credit cards are often committed, so that recently IC cards which can hardly be forged have been developed.

In a case of online certification, as the security is further strengthened by combining the encryption technology or an individual certification number therewith, it may be said that the card number is illegally read from the outside.

Further as a method of certifying an individual using a cellular telephone terminal, there has been known a method in which data for individual certification is previously sent via a cellular telephone terminal from the credit company and the individual is certified for payment by collating the individual certification data to the individual certification number.

In any of use of the IC card, online certification, and issuing of individual certification data via a cellular telephone terminal, however, there are the problems of "use of fixed information" and "existence of a card writer", and therefore the risk that personal data is illegally read has not been completely eliminated. Further there is still no complete solution for online payment and clearance for the cyber business which will develop more and more in the future.

DISCLOSURE OF THE INVENTION

The present invention provides an individual certification method using a portable terminal, and proposes a safe and quick individual certification method realized by temporally using meaningless and unfixed signal information between networks in which complete security is not insured.

In the individual certification method according to the present information, query code generated by an certification server based on a request from a portable terminal is received by the portable terminal, the query code is returned from a sales management server to the certification server, the query code generated by the certification server is collated to the query code returned from the sales management server, and if the two codes are identical, the personal data corresponding to the query code is transmitted to the sales management server.

The query code should preferably comprises a code having nothing to do with the personal data.

The query code should preferably be different from any one generated by the certification server in the past.

The query code received by the portable terminal should preferably be read by a reader connected to the sales management server.

The query code received by the portable terminal should preferably be displayed on the portable terminal as bar code or two-dimensional code and be read by the reader.

The query code should preferably contain musical sound data and be read by the reader after the musical sound data is converted to real sound in a sound source of the portable terminal.

After query code is generated by the certification server, the query code should preferably be deleted after a prespecified period of time has passed so that the collation can not be performed any more.

BEST MODE FOR CARRYING OUT THE INVENTION

Preferred embodiments of the present invention are described below with query to the related drawings.

Figure 1:
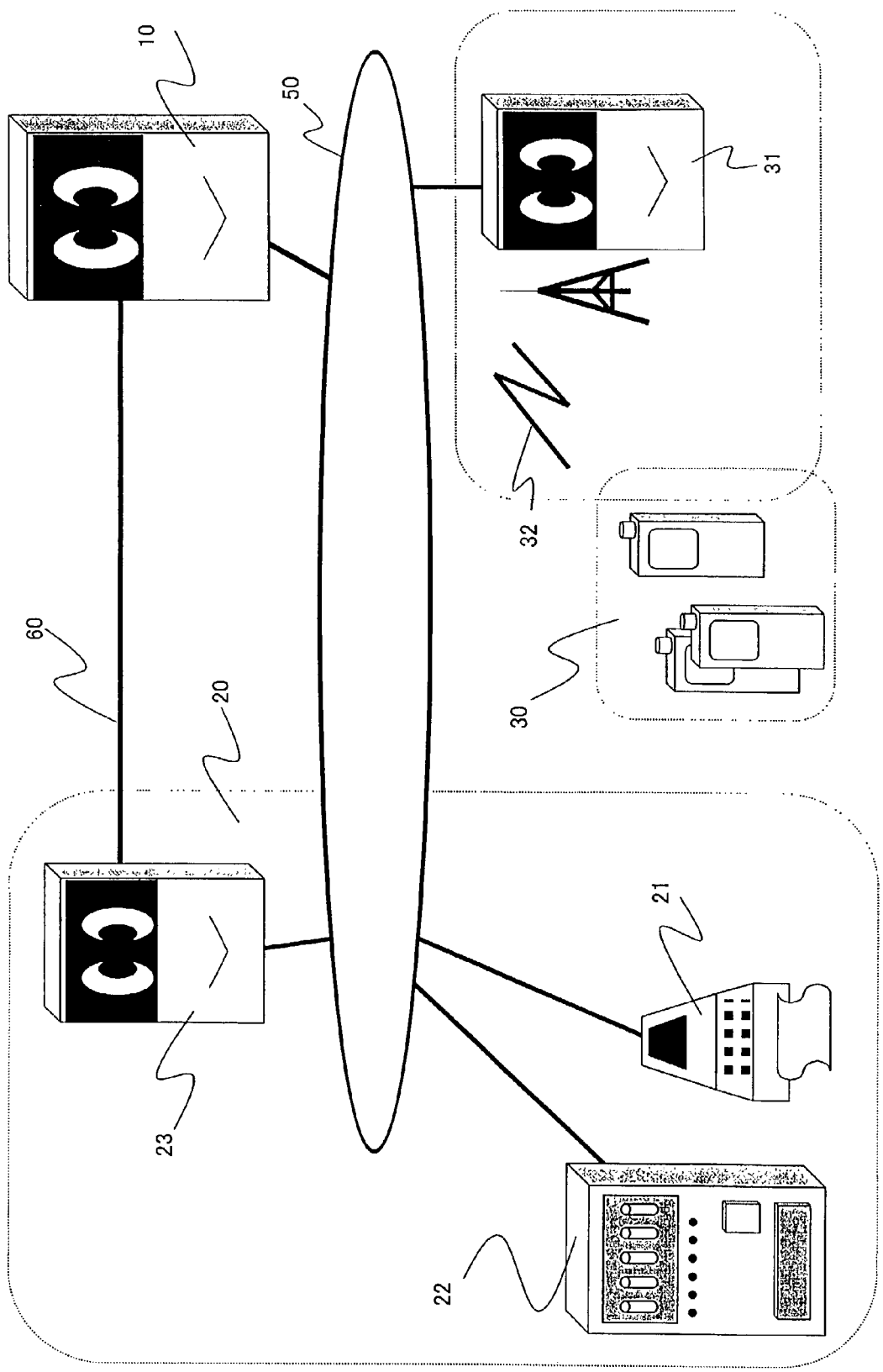
FIG. 1 is an explanatory view showing an individual certification system according to the present invention as a whole.

FIG. 1 is an explanatory view showing an individual certification server according to the present invention as a whole, and a range 20 enclosed by the dotted line in the figure shows the state in which a reader 21 provided at a side for providing various types of commodities or services, or a reader incorporated in such a machine as an automatic selling machine 22 (not shown) and a sales management server 23 for controlling the readers are connected through a network such as the Internet.

In the conventional technology, payment of a fee with an ordinary type of credit card or the like is performed within this range 20, and the credit card is read by the reader 21 or the like to certify the individual.

In FIG. 1, a server 31 for portable terminals administrating a group of portable terminals 30, 30, . . . is connected to the network 50, and the group of portable terminals 30, 30 . . . and the server 31 for portable terminals are connected to each other through a radio link. The code 10 indicates an certification server for certifying an individual of each portable terminal 30 in the group of portable terminals 30, 30 . . . , and this certification server is connected to the network 50 and also to the sales management server 23 through a private line 60.

Figure 2:
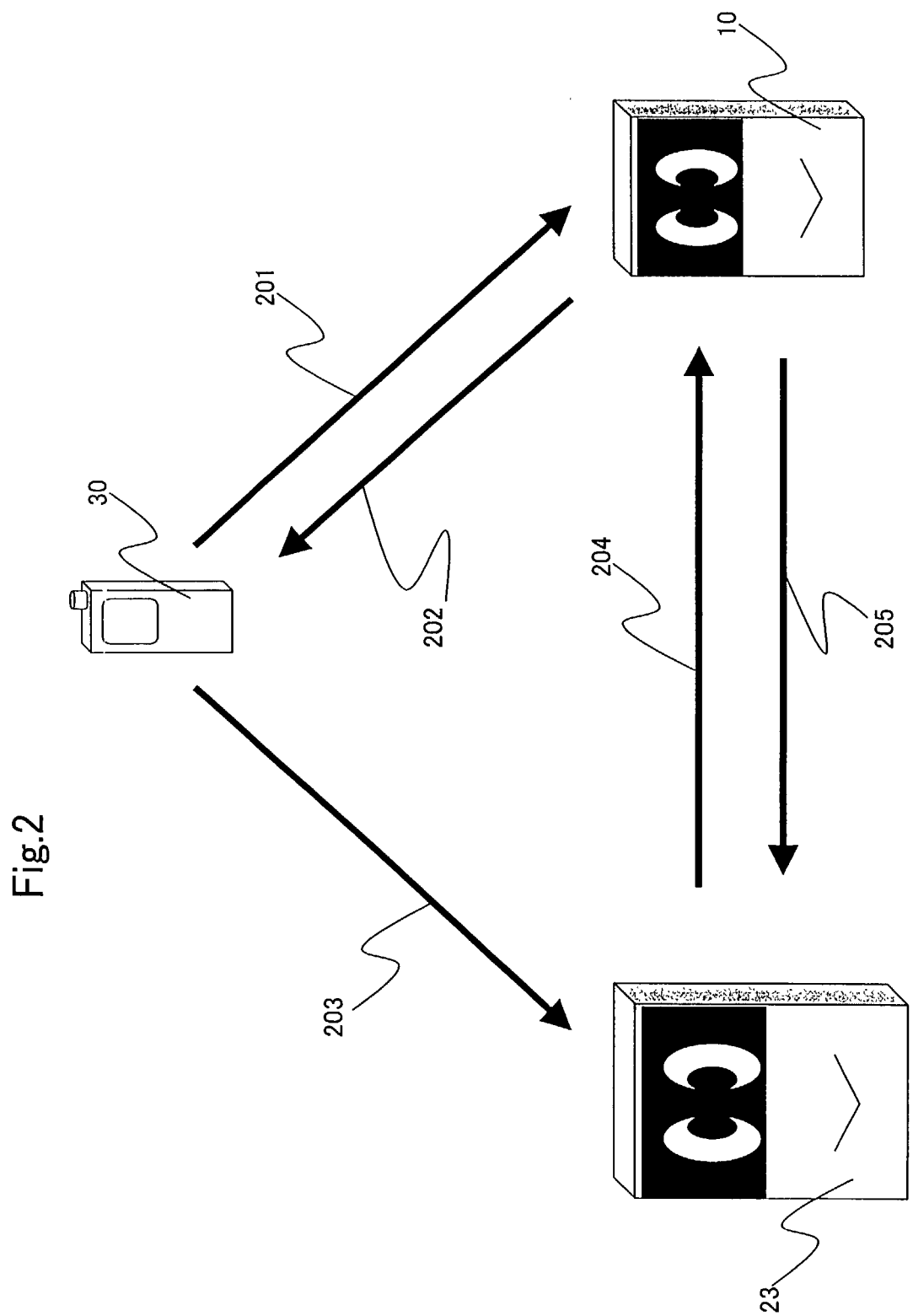
FIG. 2 is an explanatory view showing a basic principle of the present invention.

In the method according to the present invention, when an owner of the portable terminal 30 pays a service fee, when the owner hopes to identify him or her, the owner uses the portable terminal 30 in place of a credit card, a debit card, a cash card, or any type of certificate, and the basic principles are described below with query to FIG. 2.

At first, when certification is requested from the portable terminal 30 to the certification server 10 (through a path 201), the certification server 10 transmits query code to the portable terminal 30 (through a path 202). The portable terminal 30 sends the query code to the sales management server 23, for instance, via the reader 21 (through a path 203). This reader 21 is of the non-contact type. This sales management server 23 transmits the query code to the certification server 10 to ask certification of the query code (through a path 204). The certification server 10 verifies the query code to that previously generated, and returns a result of verification and the personal data required by the sales management server 23 to the sales management server 23 (through a path 205).

The query code for certification described above is generated anew when requested by the portable terminal 30, and the code is a temporary and meaningless sign, which is never used for any other portable terminal 30 or even when requested by the portable terminal 30 itself again.

It should be noted that the certification server 10 and the sales management server 23 may be physically identical ones.

Again referring to FIG. 1, a flow of the query code is described. When a user tries to make a payment using the reader 21 connected to the network 50, an automatic selling machine 22, or the like, at first certification of the user is required.

The user hoping to make a payment requests transmission of the user's query code to the certification server 10 from the portable terminal 30 which the user currently carries. This request signal is carried by an electric wave provided by a cellular phone company and arrives the certification server 10 via a server 31 for a portable terminal which is a signal conversion server for connection to the network 50.

The certification server generates query code to the requesting user, and transmits the query code through the same signal path used for transmission, but in the reverse direction. The portable terminal 30 having received the query code causes the reader 21 or other related device to read the query code in the non-contact mode, and thus the query code is transmitted via the network 50 to the sales management server 23.

The sales management server 23 transmits the query code to the certification server 10 so that the query code is verified. In this step, the query code may be transmitted through the network 50, but complete security is required between the communicating servers, and a signal path such as a private line 60 which can never be accessed from the outside is preferable.

The certification server 10 verifies query the code in query signal to the query code generated previously, and returns the result of verification and the requested matter to the sales management server 23. Once the affirmative result of verification is returned, the user is certified, and the subsequent procedure shifts to the normal one performed by a credit company or the like routinely.

Figure 3:
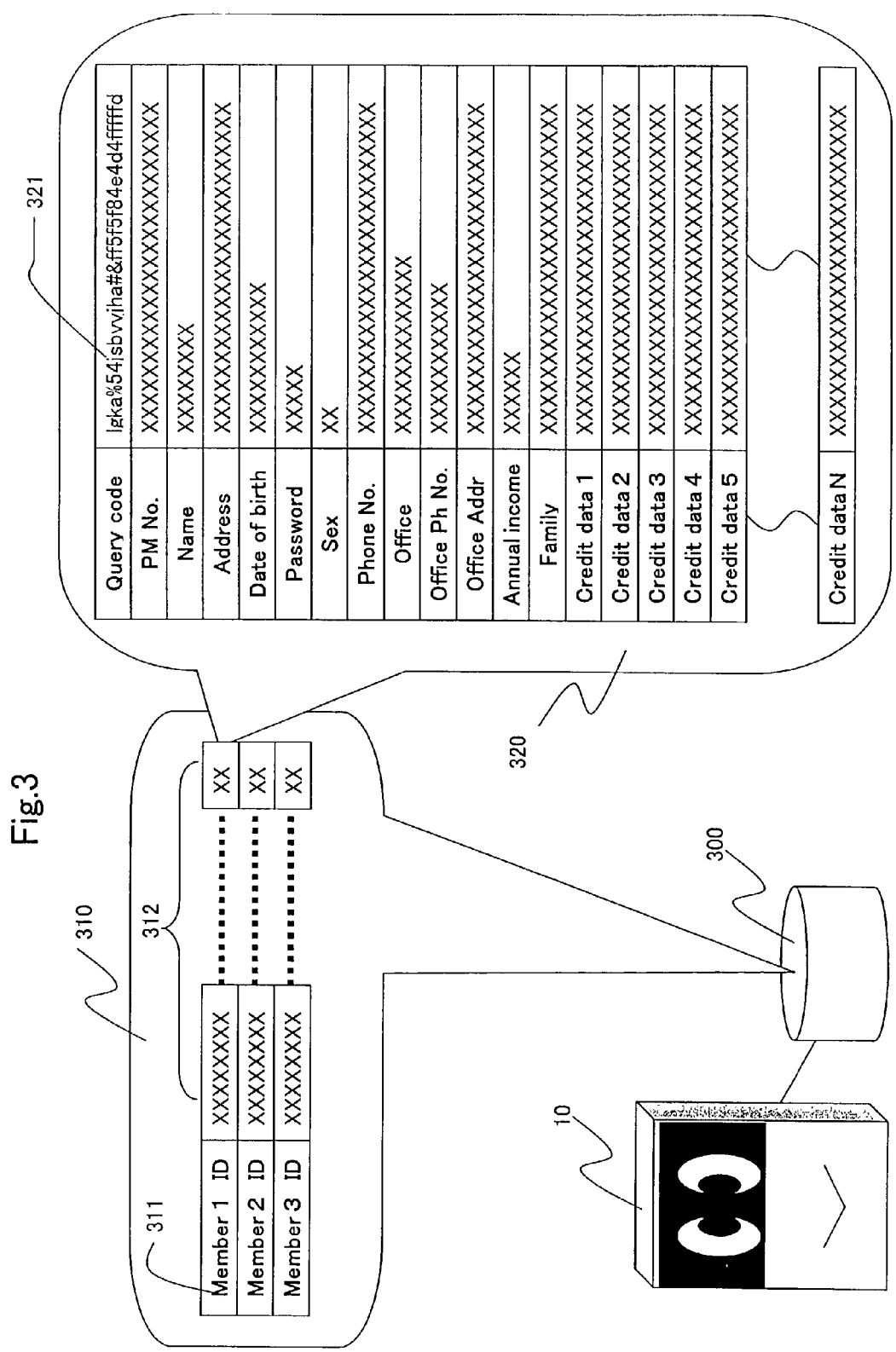
FIG. 3 is a block diagram showing a data file for individual certification stored in an certification server 10.

Next the "query code" is described with reference to FIG. 3 showing configuration of a data file for individual certification accumulated in the certification server 10. In FIG. 3, a data file 310 for individual certification consisting of a group of data records for individual certification is recorded in a data storage medium 300 provided in the certification server 10. Each data record 320 for individual certification comprises a member ID 311 which is an identification number for each individual and other items 312, and a "query code" 321 is present as one of the items 312.

Namely, the "query code" 321 is one piece of data existing as a one filed of the data record 320 for individual identification in the data file 310 for individual certification which is a group of data records each for individual certification to be stored in the data storage medium 300 of the certification server 10.

It should be noted that this data is temporary one which is generated first when a request signal is received from the portable terminal 30 and exists within a prespecified period of time and is deleted when a query signal is not received from the sales management server 23 within a certain period of time. The data is not fixed one, and varies each time it is generated in the field. It is preferable that the data is different from meaningful and specific data such as a data record for individual certification, and also that the data is not one converted or enciphered from fixed data. As understood from description of the transmission means above, not manual work is required, so that a number of digits of figures or characters used for the data may be many, for instance 50 digits including half-size alphabetical or numerical letters and some half-size signs. Therefore, the extremely large number of digits such as 1000 digits is allowable to be used for the data.

Figure 4:
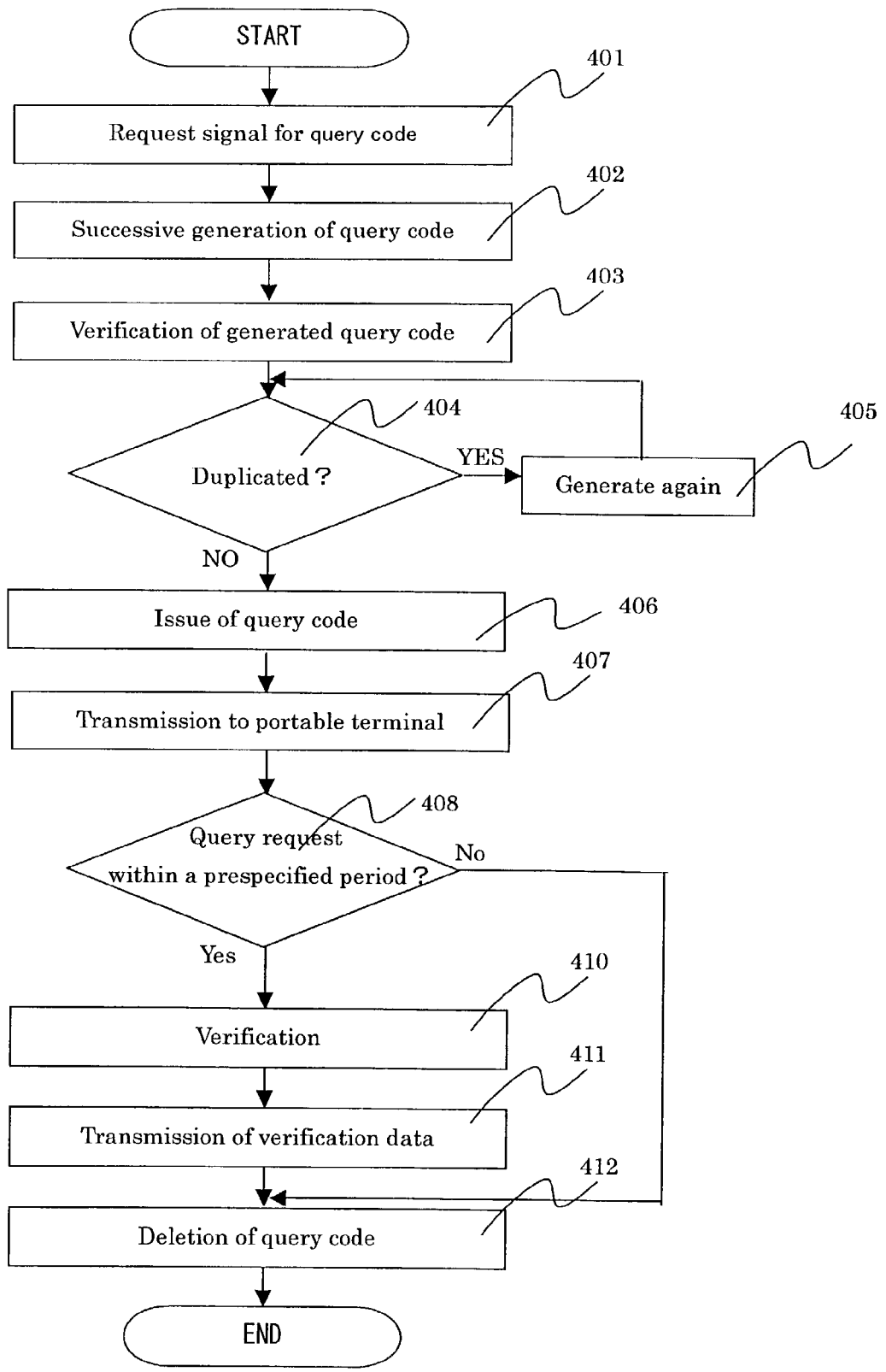
FIG. 4 is a flow chart showing a sequence of operations from generation of a "query code" in the certification server 10 to deletion thereof.

The processing steps from generated of a "query code" up to deletion thereof in the certification server 10 are described below with reference to FIG. 4.

At first, when the certification server 10 receives a request for query code from the portable terminal 30 owned by a registered member (step 401), certification is performed to check whether the user is a registered member or not.

When it is certified that the user is a registered member, the certification server 10 generates a "query code" (step 402), this query code is immediately verified to the query code generation history data (step 403) to check whether the query code is one generated in the past or not (step 404), and if it is determined that the data is a duplicated one, query code is generated again (step 405). A new query code is generated to evade risks which might occur if the query code generated in the past is known to any other person and is used illegally.

The query code generated as described above is issued (step 406), and is transmitted to the portable terminal 30 (step 407). Then, the query code is put under control by a timer or the like, and whether a request for verification has been issued from the sales management server 23 or not is checked (step 408). When it is determined with a time or the like that a request for verification has not been received within a prespecified period of time, the query code is deleted (step 412). On the other hand, when it is determined that a request for verification has been received the sales management server 23 within the prespecified period of time, the query code is verified (step 410) with the requested individual data transmitted (step 411), and at the same time the "query data" previously generated is deleted (step 412).

Figure 5:
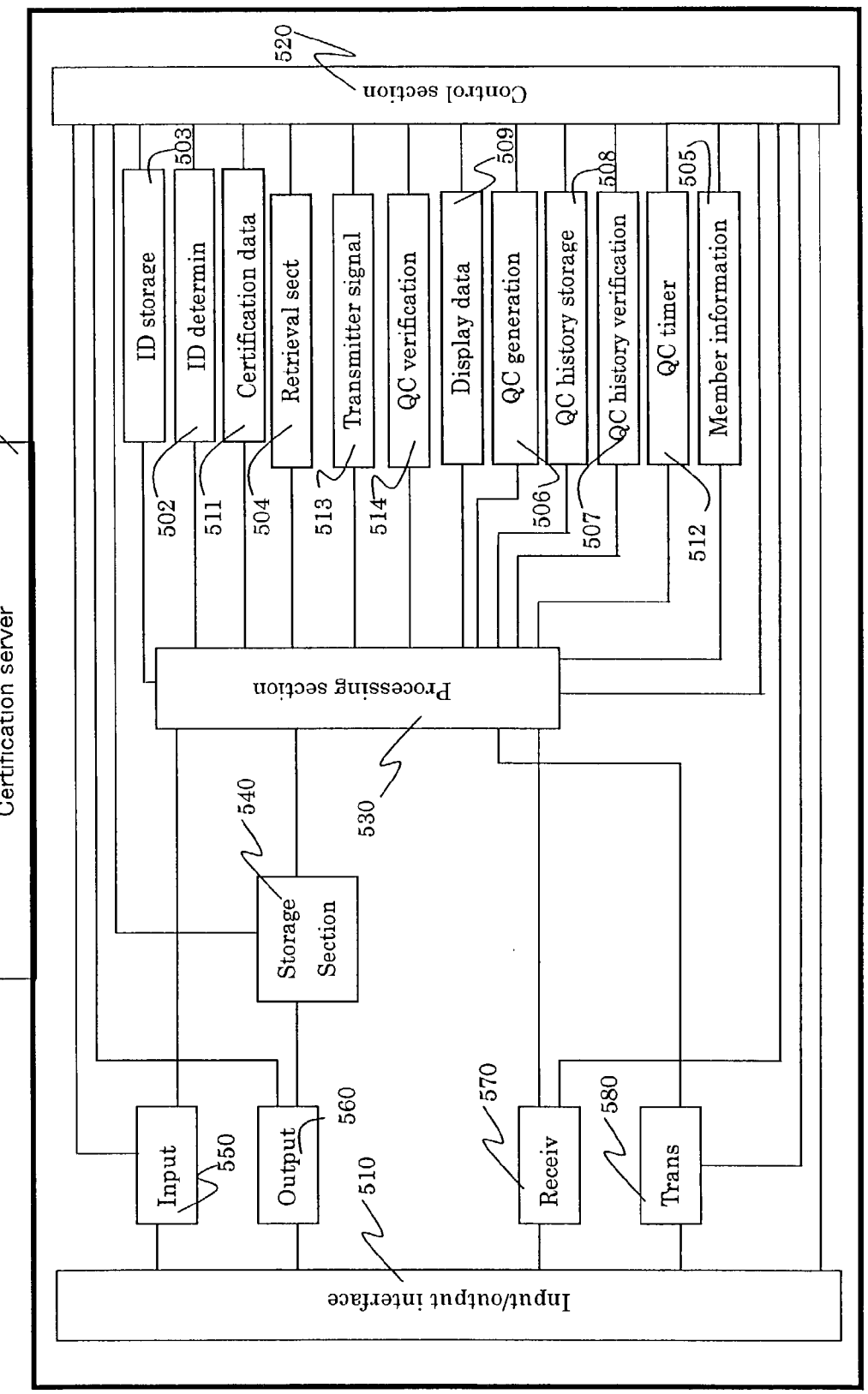
FIG. 5 is a block diagram showing configuration of the certification server 10.

FIG. 5 is a block diagram showing configuration of the certification server 10. The server 10 comprises, as components to be provided in a server for processing, inputting, outputting, transmitting, and receiving various types of data, a control section 520 for controlling operations of the entire certification server 10, a processing section 530 for executing data processing, input/output interface 510 connected to various types of input/output devices and to the network 50 or the like, an input section 550 for receiving data from the input/output interface 510, an output section 560 for outputting data, a storage section 540 for temporally storing therein data during data processing, a receiving section 570 for receiving various types of data, and a transmission section 580 for transmitting various types of data.

In addition to the components which should generally be provided, the certification server 10 further comprises an ID determination section 502 for determining an ID of a request signal or a query signal, an ID storage section 503 for storing registered IDs therein, a registered data retrieval section 504 for retrieving member information from member ID, member information storage section 505 for storing member information such as query code data, query code generation section 506 for generating new query code data, query code history verification section 507 for verifying new query code data to those generate in the past to eliminate duplication, query code history storage section 508 for storing therein query code data generated in the past, a display data generation section 509 for converting the query code data to those having a format for display on a portable terminal, a certification data generation section 511 for extracting and generating personal data requested with a query signal, query code timer management section 512 for managing new query code data as a portion of member information for a certain period of time, a transmitter signal generation section 513 for personal data generated by the certification data generation section 511 to those having a signal formal acceptable to the sales management server 23, and query code verification section 514 for verifying query code in a query signal from the sales management server 23 to that stored therein.

Now actions of the certification server 10 are described below.

In the certification server 10, query code request signal from the portable terminal 30 is transmitted via the input/output interface 510 to a receiving section 570. Upon an instruction from the control section 520, the processing section 530 queries the ID determination section 502 as to whether the request signal is previously registered one or not, and the ID determination section 502 verifies the request signal to data stored in the ID storage section 503, and transmits the request signal to the storage section 540 only after it is determined that the request signal is registered one.

The processing section 530 having received an instruction from the control section 520 queries the registration data retrieval section 504 as to which member ID 311 the request signal corresponds to, the registration data retrieval section 504 further verifies the request signal to data stored in the member information storage section 505, and reports the data to the processing section 530. The processing section 530 having received the report issues an instruction for generation of new query code data in query code field for the data to the query code generation section 506, and transfers the generated new query code data to the storage section 540. Then the processing section 530 queries the query code history verification section 507 as to whether the new query code data is the same as any query code data generated in the past or not. The query code history verification section 507 verifies the new query code data to the query code history storage section 508, and when it is reported that the new query code data is duplicated one, the query code history verification section 507 again issues an instruction for generation of new query code data to the query code field for the data, and thus repeats the processing steps.

The repetition is finished and the processing shifts to the next job only when the processing section 530 receives a report that the new query code data is not duplicated one. In this case, the query code data is stored in the member information storage section 505, and the processing section 503 instructs the display data generation section 509 to convert a data format of the new query code data to that previously decided, and transmits the converted data to the storage section 540. The new query code data with the prespecified data format is transferred by the processing section 530 having received the instruction from the control section 520 to the transmission section 570, and is transmitted via the input/output interface 510 to the requesting portable terminal 30. Then the new query code data is put under management by the query code timer management section 512, and when a query signal is not received within a prespecified period of time from the sales management server 23, the new query code data is automatically deleted by the query code timer management section 512.

Figure 6:
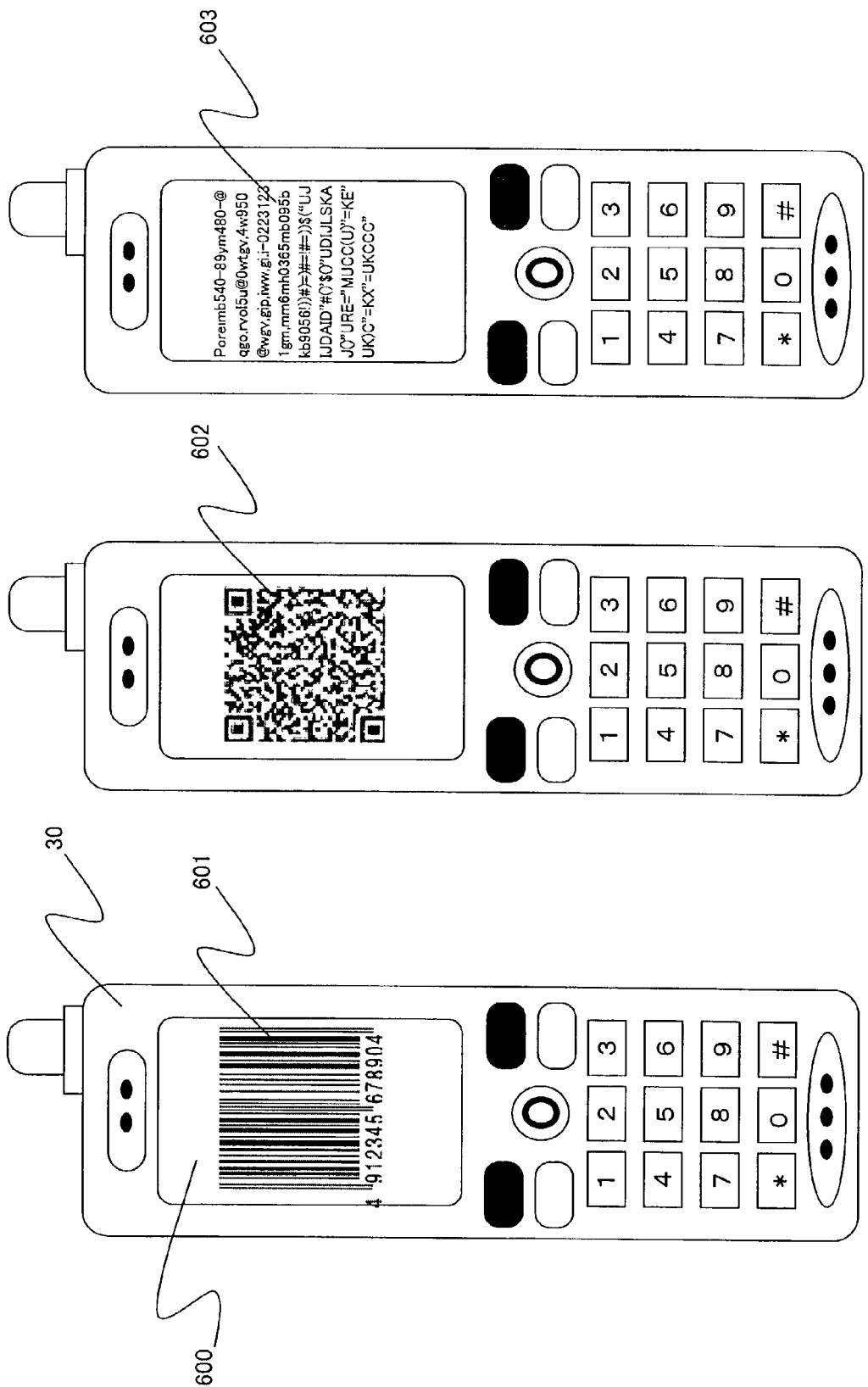
FIG. 6 is an example of display of query code data in a portable terminal monitor.

As described above, a data format of new query code data is converted in the display data generation section 509, so that the portable terminal 30 can receive new query code data having various types of data formats. For instance, as shown in FIG. 6, the new query code data may be displayed on a liquid crystal monitor 600 of the portable terminal 30 as bar code 601, two-dimensional code 602, or character code data 603 to be read by various types of readers 21. The bar code 601 and two-dimensional code are optimum because the meaning can not visually be understood, but also the character code data 603 is originally a meaningless sign as described above, so that security of the data for individual certification is insured even if the data is exposed to anyone.

When the portable terminal 30 has a connection terminal to external devices or a port for infrared data communication, the portable terminal 30 can deliver the received new query code data to the reader 21 or the like installed at various sites for sales activities via these external connection terminals. It is needless to say that, if the reader 21 or the like has an audio coupler, the new query code data can also be delivered as voice data.

The new query code data is transmitted from the various types of readers 21 or the like to the sales management server 23.

The sales management server 23 transmits a query signal to the certification server 10, and the query signal is transmitted via the input/output interface 510 in the certification server 10 to the receiving section 570. The processing section 530 queries the ID determination section 502, upon an instruction from the control section 520, as to whether the query signal is a signal previously registered for the sales management server 23 having a contractual relation or not, and the ID determination section 502 verifies the signal to data stored in the ID storage section 503, and transfers the signal to the storage section 540 only when it is determined that the signal is registered one.

Then the processing section 530-issues an instruction for query of the transferred query signal to the query code verification section 514. The query code verification section 514 extracts a query code from the query signal stored in the storage section 540, verifies the query code to the member information storage section 505 in which query code is accumulated therein, and returns the member ID 311 to the processing section 530 only when it is determined that the query code matches any data stored in the storage section 505.

The processing section 530 having received the member ID 311 gives the certification data generation section 511 an instruction for extraction and generation of personal data matching the requirement by the transferred query signal from the member information storage section 505. The personal data is transferred from the processing section 530 having received the instruction from the control section 520 to the storage section 540. A signal format of the personal data stored in the storage section 540 is converted to that prespecified and acceptable to the sales management server 23 such as a signal formal based on the public key cryptosystem or the common key cryptosystem, upon an instruction by the processing section 530 having received the instruction from the control section 520, by the transmitter signal generation section 513, and the converted signal is transferred by the transmission section 580 and is received via the input/output interface 510 by the requesting sales management server 23.

As described above, in this embodiment, based on the assumption that illegal interception is performed on a network such as the Internet, as the countermeasure against the illegal signal interception, only meaningless signals temporally transmitted are used to evade use of meaningful signals through the network, and meaningful signals are used only between systems having a higher security level.

Other preferable embodiments of the present invention are described below.

It is necessary to abort the meaningless and unfixed "query code" each time it is used once, and a vast number of query code is required for actual use of the present invention.

However, when the bar code described above is utilized, as generally the bar code is based on a combination of 13 digits of numerals (in the case of JAN code), there is only $10^{13}$ combinations of numerals when rules concerning the JAN code are ignored. Also in the case of "two-dimensional code", a number of combinations is theoretically only several hundred times of ordinary bar code. Further in the case of "a screen based on a combination of alphabets and numerals", although it depends on the display capability of a screen of each portable terminal, a number of digits simultaneously displayable is at most 100 digits, and a number of combinations of the alphabets and numerals is $36^{100}$.

The embodiment of the present invention described below is intended to radically increase the number of combinations, and musical sound signals are use as query code based on the utilization of a sound source incorporated in a portable terminal or the like. This embodiment is characterized in that a musical sound signal generation section 70 is provided in the certification server 10 and in addition that a musical sound recognition section 80 is provided as the reader 21.

Figure 7:
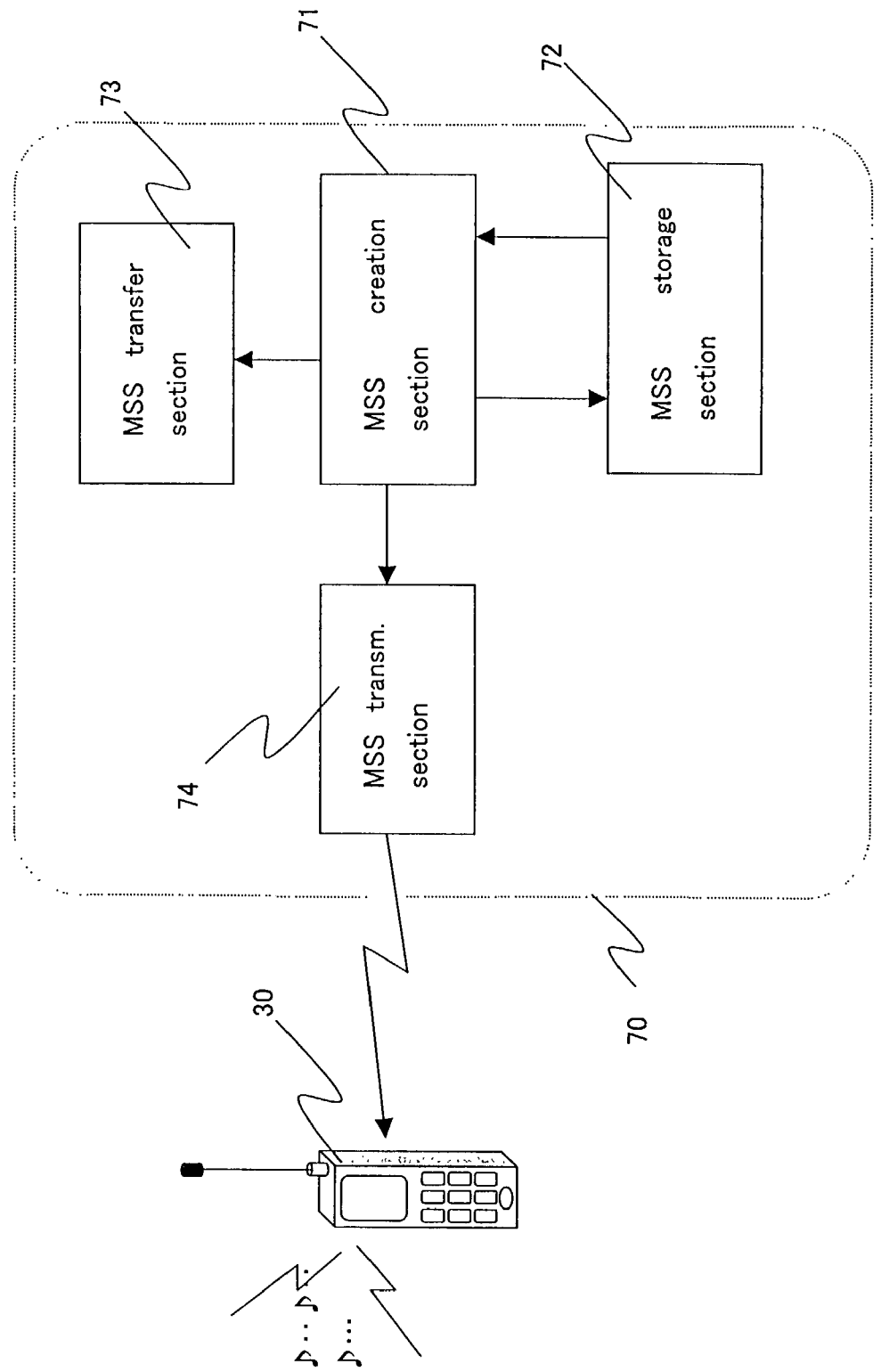
FIG. 7 is a block diagram showing configuration of a musical sound signal generation section 70 in the certification server 10.

FIG. 7 is a block diagram showing the musical signal generation section 70, and the musical sound signal generation section 70 comprises a musical sound signal creation section 71 for automatically generating a musical sound signal for at least one phrase, a musical sound signal storage section 72 for storing musical sound signals generated in the past, a musical sound signal transfer section 73 for transferring data in the automatically generated musical sound signal to a section utilizing the data as query code, namely to the query code verification section 514 in the certification server 10, and a musical sound signal transmission section 74 for transmitting the automatically generated musical sound signal to the portable terminal 30.

In FIG. 7, the musical sound signal creation section 71 having received an instruction from the processing section 530 upon a request from the portable terminal 30 automatically and at random generates a musical sound signal including musical sound data within a preset number of phrases. The musical sound signal may include not only musical sound data concerning pitch and length of a sound, but also data concerning the tone and melody.

The musical sound signal is verified to a musical sound signal stored in the musical sound signal storage section 72, and when it is determined that the musical sound signal is newly generated one, the musical sound signal is transferred to both the musical sound signal transfer section 73 and the musical sound signal transmission section 74. Namely, as described in relation to actions of the certification server 10, the musical sound signal is transferred from the musical sound signal transfer section 73 to the query code verification section 514, and at the same time a data format of the musical sound signal is converted to that adaptable to a portable terminal in the musical sound signal transmission section with the converted musical sound signal transmitted therefrom to the requesting portable terminal 30 to generate a sound signal there.

Figure 8:
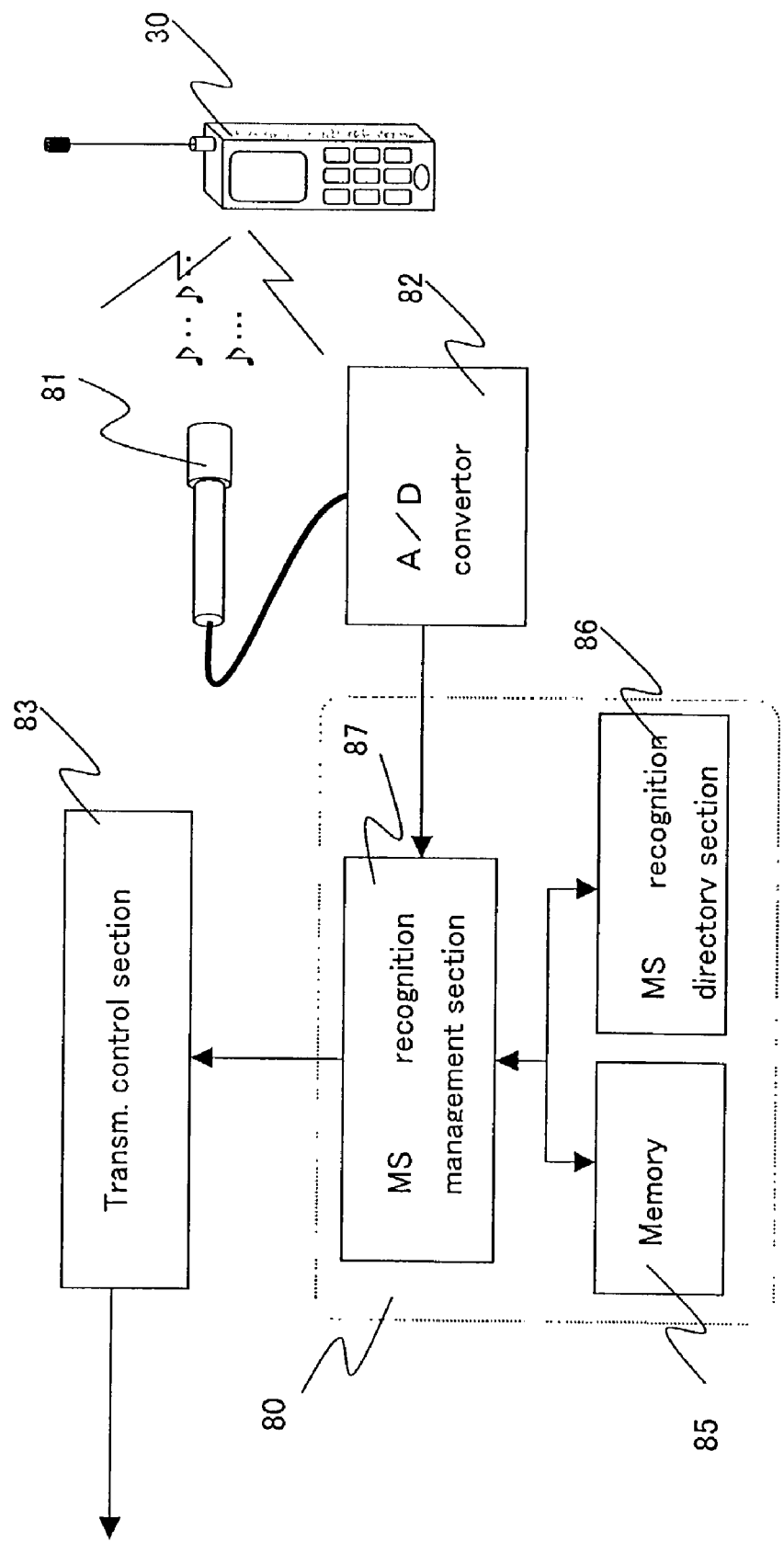
FIG. 8 is a block diagram showing configuration of a section around a musical sound recognition section 80 of a reader 21.

FIG. 8 is a block diagram showing a portion of the reader 21 around a musical sound recognition section 80 therein, and FIG. 8 shows a microphone 81 receiving a musical sound generated by a sound source of the portable terminal 30 as an electric signal, an A/D conversion section 82 for converting the analog signal received by the microphone 81 to a digital signal, a musical sound recognition section 80 for recognizing the converted digital signal as the original musical sound signal, and a transmission control section 83 for transmitting the recognized musical sound signal to the sales management server 23. The musical sound recognition section 80 comprises a memory section 85 for temporally storing, when a digital signal is recognized as the original musical sound signal, the digital signal for the task, a musical sound recognition directory section 86 for storing standard patterns to be referred to musical sound patterns recorded in the memory section 85, and a musical sound recognition management section 87 for verifying and determining the digital signal.

In FIG. 8, an analog signal received by the microphone 81 is converted to a digital signal and is transmitted to the musical sound recognition section 80. The digital signal is temporally stored in the memory section 85 according to an instruction by the musical sound recognition management section 87 with musical sound data (pitch and length thereof) in the digital signal analyzed by the musical sound recognition section 87, and the musical sound pattern of the analyzed musical sound data is verified to the standard patterns stored in the musical sound recognition directory section 86 for determination. To reduce a number of standard patterns to be stored, it is preferable to perform the analysis of musical sound data discretely for each musical note.

The musical sound signal recognized as a musical sound in the musical sound recognition section 80 is transmitted via the transmission control section 83 to the sales management server 23 as described in relation to actions of the certification server 10.

With the invention as described in claim 1, it is possible to establish safe an quick individual certification by making use of a portable terminal. Therefore, with this invention, it is possible not only to prevent theft and accidents in decoding fixed data stored in a credit card, a debit card, or a cash card, all of which are easily forged, or enciphered data therefrom, but to use the invention as a payment means for cyber businesses currently extending.

With the invention as described in claim 2 or claim 3, the security can be improved.

With the invention as described in claim 4 or claim 5, easy and quick individual certification can be realized, and as data transfer between a portable terminal and a reader can be performed in the non-contact state, such troubles as breakage of a portable terminal never occur.

With the invention as described in claim 6, a substantially infinite number of query code can be used by utilizing musical sound data, such as pitch; length, tone, and melody, of a musical sound generated in a sound source in a portable terminal.

With the invention as described in claim 7, reliability to individual certification can be further improved.

The invention claimed is:

1. An individual certification method using a portable telephone, said method comprising the sequentially executed steps of:
   requesting a unique query code from a certification server, the requesting being performed by a registered user through a portable telephone;
   verifying the user as a registered user;
   generating the unique query code on the certification server, the unique query code being a random one-time code uniquely associated with the user request;
   transmitting the unique query code from the certification server to the user's portable telephone;
   receiving by the portable telephone the unique query code generated by the certification server;
   directly and wirelessly transferring the query code from said portable telephone to a sales management server;
   then returning the query code from said sales management server to the certification server;
   comparing the generated query code transferred to the portable telephone with the query code transmitted from the sales management server in the certification server for verification; and
   transmitting user's personal identification information to the sales management server when the two query codes are determined to be identical to each other.

2. The individual certification method according to claim 1, wherein said query code comprises a sign having nothing to do with the personal information.

3. The individual certification method according to claim 1, wherein said query code is different from any query code generated by the certification server in the past.

4. The individual certification method according to claim 1, further comprising the step of:
   reading the query code received by said portable telephone with a reader connected to said sales management server to directly transfer the query code to the sales management server.

5. The individual certification method according to claim 4, further comprising the steps of:
   displaying the received query code on said portable telephone as bar code or two-dimensional code; and
   reading the bar code or two-dimensional code with said reader.

6. The individual certification method according to claim 4, wherein said query code includes musical sound data generated in a sound source of said portable telephone and is input to said reader.

7. The individual certification method according to claim 1 further comprising the step of:
   deleting the generated query code within a prespecified period of time after generation of the query code in the certification server to disable the verification described above.

8. The individual certification method according to claim 1, wherein said query code is meaningless and unfixed signal never used before.

9. The individual certification method according to claim 1, further comprising the step of checking by the certification server, upon a request of the query code from the portable telephone, whether a user of the portable telephone is a registered member or not.

10. An individual certification method comprising the sequentially executed steps of:
   requesting, by a registered user of a portable telephone, a unique query code from a certification server through a first path;
   generating the unique query code on the certification server, the unique query code being a random one-time code uniquely associated with the user request;
   sending the unique query code generated on the certification server to the portable telephone through the first path;
   directly and wirelessly transferring the generated unique query code from said portable telephone to a sales management server;
   transmitting the query code from said sales management server to the certification server over a second path different from said first path;
   verifying in the certification server that the query code transmitted from the sales management server is identical to the unique query code generated by the certification server; and
   transmitting, from the certification server to the sales management server through said second path, personal identification information of the user associated with the unique query code to based upon the verification of the received query code.

* * * * *